Patented Nov. 3, 1936

2,059,278

UNITED STATES PATENT OFFICE 2,059,278

PROCESS FOR MAKING SPONGE RUBBER ARTICLES

Walter Scott Robinson, La Porte, Ind., assignor to E. I. Du Pont de Nemours and Company, Wilmington, Del., a corporation of Delaware No Drawing. Application November 24, 1933, Serial No. 699,501

2 Claims. (Cl. 18—53)

My present invention relates to improvements in a process for making sponge rubber articles. I am aware that it has heretofore been suggested to employ animal or vegetable fibres as a filler for vulcanizing rubber stock, and I am also aware that a process has heretofore been described for making sponge rubber with an animal or vegetable fibre filler in which the fibres are wet with water so that during vulcanizing and curing the water contained in the fibres will gasify to provide the pockets or voids, the presence of which are characteristic of gassed or sponge rubber products.

In my experience in the manufacture of sponge or gassed rubber products containing an animal or vegetable fibre filler I have found that with sponge rubber in which the voids are formed by steam or gasified water the product is liable to collapse upon the condensation of the steam and the change of surrounding conditions and that such collapsing is far from uniform as the voids in sponge or gassed rubber are sometimes communicating and sometimes separated so that the final product is of a lumpy and uneven consistency.

Further, I have found that the presence of water, or even a considerable degree of moisture, in the vegetable or animal fibre filler, interferes with the integration of the fibres with the other elements of the vulcanizable composition. Animal or vegetable fibres, particularly animal fibres, and to some extent vegetable fibres, readily take up moisture from the air and also from other substances with which they may be brought in contact. The principal other substance, in a vulcanizable rubber composition, from which the animal or vegetable fibres can obtain moisture is the crude commercial rubber itself, which I have found contains considerable moisture as it is bought upon the market.

As will hereafter be seen, I not only dry the animal or vegetable fibres which I employ as a filler, but I also dry the crude commercial rubber before mixing and in addition I add to the composition of these dried materials a sufficient quantity of relatively heavy oil, known to the trade as petrolatum, which it is not unusual to add to vulcanizable stock so that it does not interfere with vulcanization, but as I employ it, it most readily mixes with and impregnates the vegetable or animal fibres so as to not only exclude water therefrom, but actually to be repellent to water inadvertently present. In the practice of my new process I find that I can uniformly secure a homogeneous product free from the unevenness characterizing products heretofore made in which animal or vegetable fibres have been used as fillers, and I also secure a product in which the fillers are much more thoroughly integrated with the other elements of the composition.

In the practice of my process I dispose the crude commercial rubber and the hair or vegetable fibres in a suitable arrangement for best drying the same in a drying room where they remain usually over night. The crude commercial rubber and the fibres are then mixed in the usual mixing machine with a suitable amount of petrolatum and such other dry chemicals as are generally required. After a thorough admixture, by means of which the oil is caused to thoroughly impregnate the fibre, chemical accelerating and gasifying elements, such as a suitable carbonate and acid, are added and the mixing is continued until the desired consistency is secured. When a stock so prepared is vulcanized and cured in the usual manner a homogeneous and uniform product is secured which weighs appreciably less than other sponge rubber with which I am familiar.

Having described my invention what I claim as new and desire to secure by Letters Patent is:

1. The process for making sponge or gassed rubber consisting in drying the desired amounts of animal or vegetable fibres and rubber, then mixing the said dried rubber and fibres with a relatively heavy mineral oil so as to render the fibres water-repellent, then adding to said mixture the usual ingredients of gassed or sponge rubber stock including chemical gasifying agents, mixing and vulcanizing the stock.

2. The strong, springy, resilient, soft, sponge rubber product obtainable by drying the desired amounts of animal or vegetable fibres and rubber, then mixing the said dried rubber and fibres with a relatively heavy mineral oil so as to render the fibres water-repellent, then adding to said mixture the usual ingredients of gassed or sponge rubber stock including chemical gasifying agents, mixing and vulcanizing the stock.

W. SCOTT ROBINSON.

CERTIFICATE OF CORRECTION.

Patent No. 2,059,278.                                                                                                      November 3, 1936.

WALTER SCOTT ROBINSON.

It is hereby certified that error appears in the printed specification of the above numbered patent requiring correction as follows: Page 1, first column, line 5, for the word "vulcanizing" read vulcanizable; and that the said Letters Patent should be read with this correction therein that the same may conform to the record of the case in the Patent Office.

Signed and sealed this 23rd day of February, A. D. 1937.

(Seal)                                                                      Henry Van Arsdale
                                                                  Acting Commissioner of Patents.